March 15, 1932.  J. T. DICKSON  1,849,177
AUTOMATIC OPERATING DEVICE FOR CLUTCHES
Filed June 19, 1928
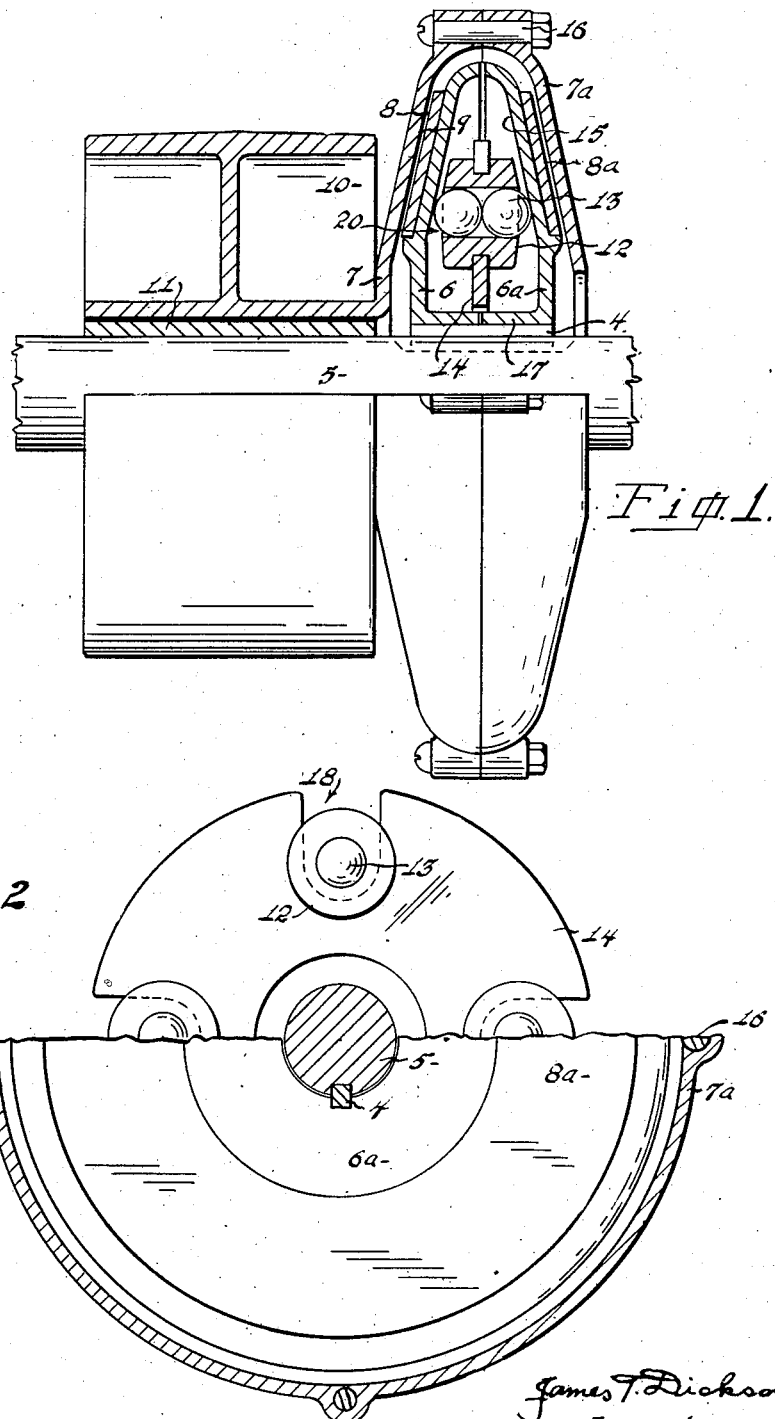
James T. Dickson
Inventor.

Patented Mar. 15, 1932

1,849,177

UNITED STATES PATENT OFFICE

JAMES T. DICKSON, OF LOS ANGELES, CALIFORNIA

AUTOMATIC OPERATING DEVICE FOR CLUTCHES

Application filed June 19, 1928. Serial No. 286,581.

My invention relates to clutches of the type set forth in my Patent No. 1,618,644 and particularly to clutch operating mechanisms whereby the clutch engages automatically only when the prime mover has attained the proper speed or power output and whereby the maximum torque is predetermined.

In the clutch described in the said patent the entire operating mechanism is loose on the shaft so as to be delayed in accelerating whereas in the present invention only the centrifugally effected weights are loosely carried.

The invention has among its principal objects the provision of certain advantages in function and construction as will appear hereinafter, particularly sensitiveness and freedom from any tendency of wedging parts to become jammed, and, the elimination of thrust bearings, clutch collars and other troublesome and expensive parts common to ordinary clutches.

In the present invention the drive shaft carries a drive member movable axially of the shaft into clutching contact with a driven member, as in practically all common clutches. The driving member is however operated automatically by centrifugally effected means comprising weights or the like loosely associated with the driving member so as to be delayed in reaching operative speed. These weights act at a suitable angle, preferably an acute angle, against the driving member to move it into engagement with the driven member when the weights have attained a given speed, and to hold the driving member in such operative position with a given degree of thrust so that when excessive torque is reached, the clutch is free to slip. In order that the device will release when speed decreases the weights are arranged to be comparatively frictionless so that they do not become jammed even when acute angles are employed. The frictionless weights are also employed as the sole thrust receiving means between the parts which are movable axially of the shaft and those parts which are fixed to the shaft, thereby eliminating thrust bearings and the like; the weights thereby serving a dual function with resultant efficiency and simplicity.

I have illustrated by the accompanying drawings, one practical embodiment of my invention altho I am by no means limited thereto.

In the said drawings:

Figure 1 is a view partly in vertical section and partly in elevation of the said embodiment.

Figure 2 is an end view thereof, the upper part of the view showing the driving and driven members both broken away to reveal the centrifugally effected means; the lower half of the view showing the driven members broken away to reveal the driving member in end elevation.

The numeral 5 indicates a drive shaft which is to be driven by a prime mover such as an electric motor (not shown). On the shaft is keyed a driving member 6 adapted to move axially of the shaft along the key while being caused to positively rotate with the shaft. Adjacent to the driving member is a driven member 7; the driving member being provided externally with a clutch facing 8 which frictionally engages the corresponding surface 9 of the driven member when the driving member is moved toward the driven member. The driven member is integral with a pulley 10 which has a bushing running free on the shaft as at 11 whereby the driven member and the pulley are loose on the shaft and independent thereof except when the driving member is in engagement therewith. Such arrangement of driving and driven members and pulley is common to many type of clutches. Another driving member 6a is also provided, this being preferably, but not essentially fixed to the key so that while it revolves with the shaft and the driving member 6 it is not movable axially of the shaft and provides a thrust member. When the movable driving member 6 is thrust away from the driving member 6a the clutch is "in" engagement as in all disc and drum types of clutches.

To automatically force the members 6 and 6a apart I provide the centrifugally effected means consisting of the weights 12, the balls 13 and the spider 14, same being loosely contained between the driving members 6 and 6a respectively. Accordingly the driving members, which are simple discs, are inclined or converged outwardly to provide inside opposed thrust surfaces of acute angular convergence. Thus when the weights are moved radially out by centrifugal force the driving members are spread apart. Peculiar to the present embodiment there is provided a clutch facing 8a on the outside of the driving member 6a to provide increased clutch facing area and so that the driving members jointly have no preponderance of thrust in either direction axially of the shaft. Accordingly I provide a second driven member similar to the member 7; the members 7 and 7a converging to correspond with the convergence of the driving members and to jointly provide a housing for the parts previously described. Members 7 and 7a are connected by bolts 16. The driving members each have an integral sleeve 17 whereby they are centered on the drive shaft.

The spider is merely an annular disc loosely encompassing the shaft and the sleeves 17. The spider is provided with radial notches 18 and the weights are of spool shape, each fitted loosely in a notch so as to extend transversely while being freely movable radially of the space between the driving members. Each transverse weight is provided with a transverse open end bore 20 in which two of the balls are disposed; each ball riding on the corresponding inner surfaces 15 of the driving members, the two balls rolling on each other. Since the balls have only rolling contact with driving members and with each other friction is reduced to a minimum and the angle of convergence of the driving members may be slight while the weights are equally as sensitive under centrifugal force as they are to opposing forces tending to return them to normal position when the centrifugal force is diminished.

As to the operation; when the drive shaft starts to revolve the weights have only slight contact with the driving members and therefore they are slow to become accelerated, thus providing the desired retarded effect. Finally, of course, the weights attain sufficient speed that their centrifugal force will move them outwardly between the converging surfaces of the driving members to force the driving members each into engagement with the corresponding driven member; the clutch being thus automatically thrown "in". Considering a predetermined angle for the inside surfaces of the driving members and a predetermined speed, the thrust of the clutch facings and the frictional contact of same with the driven members is predetermined and thus the clutch will slip when excess torque occurs, particularly since the weights and balls do not jam between the acute angled surfaces. Should the speed of the prime mover decrease, due to overload or when the power is discontinued, the balls and weights will allow the parts to assume normal disengaged, or partially engaged position accordingly, and will not again put the clutch in fully operative position until an interval after full speed and carrying ability is reached by the prime mover.

Summarizing the advantages of function and construction it will be seen that the device as a complete clutch is simple, compact and enclosed and has no thrust bearings, thrust collars, clutch rollers, washers, nuts or the like for connection with the drive shaft; the only connection being the single key. The parts are all self centering and free to aline themselves each with corresponding other parts. The operating device is particularly sensitive both in retardatively taking up the load and in quickly releasing when the load is excessive. The weights with the contained balls are simple and efficient and not only serve as centrifugally effected operating means but also serve as highly efficient friction reducing and thrust carrying means.

While I have shown and described a specific construction for the clutch and driving and driven members, and have shown and described a specific construction for the operating means, it is understood of course that the operating means in any one or more of a variety of embodiments may be applied to the clutch construction shown or to any other clutch construction to which it is adapted or adaptable; without enlarging the scope of my invention and without reaching beyond the scope of the appended claims.

I claim:

1. In a clutch, a shaft, and clutch operating means comprising, a pair of spaced driving members rotatable with said shaft and relatively movable axially of said shaft, said members presenting opposed outwardly converging surfaces, an annulus resembling a relatively thin disc loosely encompassing said shaft and loosely contained between said driving members, said annulus provided with radial slots opening outwardly, each slot having a pair of radiating guide edges and spool-weights each journaled in a corresponding slot in said disc to be revolubly held thereby and free to move radially in said slot by centrifugal force whereby said driving members are spread axially of said shaft, each spool-weight having a pair of enlarged ends engaging said guide edges and a longitudinal central bore, said ends serving to retain the spool on said annulus, and antifriction elements contained in said bore and bearing against said driving members.

2. In a clutch, a shaft, a clutch operating means comprising, a pair of elements to be actuated, an annulus resembling a disc loosely encompassing said shaft between said elements to be actuated and provided with circumferentially evenly spaced radial slots opening outwardly, and weights one for each slot and journaled for free radial and revoluble movement, each weight resembling a spool having enlarged ends engaging a pair of said guide edges to limit longitudinal movement and having a central longitudinal bore, and antifriction elements contained in said bore and impressed at opposite ends of said spool upon said pair of elements to be actuated.

JAMES T. DICKSON.